United States Patent Office 3,553,162
Patented Jan. 5, 1971

3,553,162
CURABLE COPOLYMERS OF PERHALOACETONE AND EPOXIDES
Harry A. Smith, Midland, Mich., assignor to The Dow Chemical Company, Midland, Mich., a corporation of Delaware
No Drawing. Continuation-in-part of application Ser. No. 631,168, Apr. 17, 1967. This application June 27, 1969, Ser. No. 838,727
Int. Cl. C08g 15/00
U.S. Cl. 260—47                    13 Claims

ABSTRACT OF THE DISCLOSURE

This invention relates to curable interpolymers of a perhaloacetone and at least one polyepoxide which may additionally contain a lower alkylene monoepoxide. Such polymers are capable of being crosslinked through the pendent epoxide groups with a polyfunctional curing agent to produce halogen-containing polymers suitable for use as coating and adhesives.

BACKGROUND OF THE INVENTION

This application is a continuation-in-part of application S.N. 631,168, filed Apr. 17, 1967 and now abandoned.

Curable polymers and copolymers are known which contain two or more epoxide groups and which are therefore curable by crosslinking through the epoxide group with a reactive polyfunctional curing agent. Such curable copolymers are useful as adhesives and coatings and are used to form molded or cast objects or films. The copolymers of this invention, however, provide to the art new interpolymers of perhaloacetones and one or more epoxides at least some of which must be a polyepoxide. Such polymers are curable in the usual manner with polyfunctional curing agents to produce hydrophobic polymers having good solvent resistance, higher softening points, better adhesion, ultraviolet resistance, and mechanical properties ranging from hard, rigid plastics to rubbers depending on the epoxide monomers used.

SUMMARY OF THE INVENTION

This invention relates to new curable interpolymers of a perhaloacetone and at least one epoxy compound containing at least two epoxide groups. This invention likewise relates to a process for preparing such polymers.

It is an object of this invention to provide new curable interpolymers of perhaloacetones and at least one polyfunctional epoxide compound and which may additionally contain one or more lower alkylene monoepoxide. A further object is to provide a method to prepare such polymers. These and other objects and advantages of the present invention will become apparent from a reading of the following detailed description.

The novel compositions of this invention comprise curable interpolymers of perhaloacetone with at least one polyepoxide containing a plurality of 1,2-epoxy groups per molecule and preferably containing at least one lower alkylene oxide. Such interpolymers have mole proportions of perhaloacetone/lower alkylene oxide/polyepoxide of from about 1/2.5/0.01 to about 1/0/1, preferably from 1/2.3/0.08 to about 1/1.0/0.75.

BRIEF DESCRIPTION OF PREFERRED EMBODIMENTS

The term "halo" as used herein is meant to include chloro- and fluoro-substituents. Perhaloacetones suitable for use in the present invention include perfluoroacetone (hexafluoroacetone) and perchloroacetone (hexachloroacetone) as well as mixed chloro- and fluoro-perhalosubstituted acetones. Illustrative mixed perhalosubstituted acetones include dichlorotetrafluoroacetone, tetrachlorodifluoroacetone, monochloropentafluoroacetone and the like.

Polyepoxides suitable for use in this invention include epoxy resins such as the diglycidyl ether of bisphenol A (diglycidyl ether of p,p′-isopropylidenediphenol), epoxidized novolacs having functionalities of greater than 2 polyglycidyl ether of a phenol-formaldehyde resin having a functionality greater than 2), butadiene diepoxide, divinyl benzene diepoxide, diisopropylidene benzene diepoxide and tri- or diepoxydiphenyl ether.

Lower alkylene oxides which may be employed in this invention include vicinal epoxides containing from 2 to 4 carbon atoms such as ethylene oxide, propylene oxide, 1,2-butylene oxide, 2,3-butylene oxide and mixtures thereof.

The polymers of this invention are characterized by being both hydrophobic and olephobic and in being crosslinkable with difunctional curing agents or tertiary amines to form substantially insoluble polymers having greatly increased softening points. Suitable crosslinking agents include polyalkylene polyamines such as diethylenetriamine and triethylenetetramine, as well as materials such as methyl nadic anhydride and tri(dimethylaminomethyl) benzene.

Ordinarily the polymers of this invention are prepared by admixing the reactants in mole proportions of perhaloacetone/lower alkylene oxide/di- or polyepoxide of from about 1/2.4/0.01 to about 1/0/1 with from about 1/2.3/0.08 to about 1/1.0/1.2 being generally preferred. These materials are reacted at temperatures ranging from about 0° C. to about 50° C., preferably from about 20–40° C. at autogenous pressure for a period of from a few hours (1–3 hours) to about 720 hours, preferably from about 24 to about 350 hours.

It is usually desirable to conduct the reaction in the presence of from about $10^{-6}$ to about $10^{-2}$ mole percent (based on the total reaction mixture) of an alkali metal fluoride as an initiator and to employ an inert substantially anhydrous atmosphere which is composed of the vapor of one or more of the reactants. Inert solvents or diluents may likewise be employed to moderate the reactions.

The following examples will serve to further illustrate the present invention but are not meant to limit it thereto.

EXAMPLE 1

Into each of several dry glass reactor tubes held at a temperature of −196° C. were added $6.60 \times 10^{-3}$ equivalents of a polyepoxide containing 0.01 gm. ($6.58 \times 10^{-5}$ mole) of CsF, 3.0 gm. (0.0181 mole) of hexafluoroacetone and 2.5 gm. (0.0430 mole) of propylene oxide. The tubes were then sealed, warmed to room temperature and agitated at this temperature for 130 hours. At the end of this time, the tubes were cooled to −196° C., opened, and warmed to room temperature. The volatiles were removed under vacuum and the remaining polymers were analyzed and tested for physical properties. The results were as shown in the following Table I.

TABLE I

| Polyepoxide | Equivalent weight ratio of reactants HFA/PO/PE | Yield, percent | Softening point °C. | Mn | Ratio of monomers in polymers HFA/PO/PE |
|---|---|---|---|---|---|
| Diglycidyl ether of Bisphenol A | 1/2.5/0.37 | 100 | ~25 | 30,600 | 1:1.56:0.11 |
| Polyglycidyl ether of phenolformaldehyde resin having a functionality of 2.5 and an EEW of 178 | 1/2.5/0.37 | 100 | 70-100 | (¹) | 1:0.5:0.75 |
| Divinylbenzene diepoxide | 1/2.5/0.37 | 100 | 235-275 | (¹) | 1:2.2:0.08 |
| Butadiene diepoxide | 1/2.5/0.37 | 100 | ~25 | 21,500 | 1:1.25:0.125 |
| Diisopropylidenebenzene diepoxide | 1/2.5/0.37 | 96.5 | ~25 | ~20,000 | 1:1.6:0.4 |

¹ Insoluble.

EXAMPLE 2

In the same manner as Example 1, 30.0 gm. (0.181 mole) of hexafluoroacetone and 18.9 gm. (0.430 mole) of ethylene oxide were condensed into a reactor tube at −196° C. containing 40 ml. of anhydrous n-hexane as a solvent. To this mixture was added 0.066 equivalents of divinylbenzene diepoxide containing 0.1 gm. (6.58×10⁻⁴ mole) of CsF. The tube was then sealed and agitated at room temperature for 9 days. At the end of this period, the reaction tube was opened and the volatiles removed. The remaining polymer accounted for 92.5 weight percent of the reactants and was found to contain a ratio of hexafluoroacetone/ethylene oxide/divinylbenzene diepoxide of 1:1.9:0.14. Further characterization of the polymer showed it to have a softening point of about 25° C. and number average molecular weight of about 20,000 (soluble in hexane and methyl ketones).

EXAMPLE 3

In a similar manner 0.181 mole of hexafluoroacetone, 0.317 mole of ethylene oxide, 0.129 mole of propylene oxide and 0.0265 equivalents of diepoxydiphenyl ether were copolymerized at room temperature for 162 hours in the presence of 0.08 gm. of CsF. A 92.5 weight percent yield was obtained of a polymer having a softening point of about 25° C., a number average molecular weight of about 22,400 and a polymer molar composition of 1:0.70:0.46:0.08 of hexafluoroacetone/ethylene oxide/propylene oxide/diepoxydiphenyl ether.

EXAMPLE 4

In a manner similar to that of Example 3, 30.0 gm. (0.1809 mole) of hexafluoroacetone, 14.0 gm. (0.3170 mole) of ethylene oxide, 7.5 gm. (0.1290 mole) of propylene oxide and 4.03 gm. (0.0265 equivalents) of diepoxydiphenyl ether were polymerized at room temperature for 162 hours in the presence of 0.08 gm. (5.26×10⁻⁴ mole) of CsF. The product was 44.57 gm. of a polymer having a softening point of about 25° C., a number average molecular weight of about 22,400 and an elemental analysis which showed 35.1 weight percent C, 2.86 weight percent H, 46.3 weight percent F and 15.74 weight percent O.

EXAMPLE 5

In a similar manner, 3.0 gm. of hexafluoroacetone, 0.96 gm. of ethylene oxide, 0.82 gm. of propylene oxide and 0.61 gm. of butadiene diepoxide were copolymerized at room temperature for 162 hours in the presence of 0.0015 gm. of CsF. A polymeric product of 3.78 gm. was obtained which had a softening point of between 113 and 114° C., a viscosity of $9.9 \times 10^4$ poises and a number average molecular weight of about 700,000. The product was insoluble at room temperature in most common solvents but was soluble in tetrahydrofuran at about 45° C.

EXAMPLE 6

A polymer of hexafluoroacetone (HFA), propylene oxide and butadiene diepoxide (BD) in a mole ratio of 1:1.25:0.125 prepared as in Example 1 was admixed with 2 equivalents of ethylene diamine as a curing agent and 0.03 equivalent of butadiene diepoxide as a reactive diluent to reduce the viscosity of the polymer during mixing. The mixture was reacted at a temperature of about 75° C. to produce a soft, opaque, rubbery solid polymer having a softening point of between about 75 and 100° C. This product would find utility as gasketing or as a shock or vibration-absorbing material.

In a similar manner, a terpolymer was prepared containing hexafluoroacetone, propylene oxide and divinylbenzene diepoxide in a mole ratio of 1:2.3:0.08, respectively. This polymer was cured with ethylene diamine to a clear, substantially insoluble, rubbery solid polymer which was thermally stable above 250° C.

Various modifications can be made in the present invention without departing from the spirit or scope thereof for it is understood that I limit myself only as defined in the appended claims.

I claim:

1. A curable polymer composition which comprises an interpolymer having mole proportions of perhaloacetone vicinal alkylene oxide containing from 2 to 4 carbon atoms/polyepoxide containing a plurality of 1,2-epoxy groups per molecule of from about 1/2.5/0.01 to about 1/0/1.

2. The curable polymer composition of claim 1 wherein the mole proportions of perhaloacetone/vicinal alkylene oxide/polyepoxide is from about 1/2.3/0.8 to about 1/1.0/0.75.

3. The curable interpolymer of claim 1 wherein the perhaloacetone is perfluoroacetone.

4. The curable interployner of claim 1 wherein the polyepoxide is divinylbenzene diepoxide.

5. The curable interpolymer of claim 1 wherein the polyepoxide is a polyglycidyl ether of a phenolformaldehyde resin having a functionality greater than 2.

6. The curable interpolymer of claim 1 wherein the polyepoxide is the diglycidyl ether of p,p′-isoproylidenediphenol.

7. The curable interpolymer of claim 1 wherein the polyepoxide is diisopropylidenebenzene diepoxide.

8. The curable interpolymer of claim 1 wherein the vicinal alkylene oxide is 1,2-propylene oxide.

9. The curable polymer of claim 1 wherein the perhaloacetone is perfluoroacetone and the vicinal alkylene oxide is 1,2-propylene oxide.

10. The curable interpolymer of claim 1 wherein the lower vicinal alkylene oxide is ethylene oxide.

11. The curable interpolymer of claim 1 wherein the lower alkylene oxide is a mixture of ethylene oxide and 1,2-propylene oxide.

12. The curable interpolymer of claim 1 wherein the polyepoxide is butadiene diepoxide.

13. The curable interpolymer of claim 1 wherein the polyepoxide is diepoxydiphenyl ether.

References Cited

UNITED STATES PATENTS 3,281,493  10/1966  Thornton et al. _____ 260—50
3,316,216  4/1967  Fawcett et al. _____ 260—63

WILLIAM H. SHORT, Primary Examiner

T. E. PERTILLA, Assistant Examiner

U.S. Cl. X.R.

117—161; 260—59, 63